(12) United States Patent
Schoenleber

(10) Patent No.: US 6,668,458 B1
(45) Date of Patent: Dec. 30, 2003

(54) AUTOMATIC FIELD CABLE STRIPPER

(76) Inventor: Paul Schoenleber, P.O. Box 624, Antioch, IL (US) 60002

( * ) Notice: Subject to any disclaimer, the term of this patent is extended or adjusted under 35 U.S.C. 154(b) by 0 days.

(21) Appl. No.: 10/453,739

(22) Filed: Jun. 4, 2003

(51) Int. Cl.[7] .............................................. B26B 27/00
(52) U.S. Cl. .................... 30/90.1; 30/500; 408/203.5
(58) Field of Search ............................. 30/90.1, 90.3, 30/500, 347, 276; 81/9.4; 408/203.5, 204; 172/13

(56) References Cited

U.S. PATENT DOCUMENTS

| | | |
|---|---|---|
| 969,339 A | 9/1910 | Chytraus |
| 3,614,905 A | 10/1971 | Bieganski |
| 3,623,384 A | 11/1971 | Murphy |
| 3,778,179 A * | 12/1973 | Rivas ..................... 408/204 X |
| 3,999,869 A * | 12/1976 | Clark et al. ............. 408/204 X |
| 4,027,557 A | 6/1977 | Stepan |
| 4,059,893 A | 11/1977 | Solury |
| 4,317,279 A * | 3/1982 | Smith et al. ................. 30/90.1 |
| 4,547,966 A * | 10/1985 | Eden ........................ 30/500 X |
| 4,594,029 A | 6/1986 | Michael, III |
| 4,729,268 A | 3/1988 | Morrow |
| 4,914,818 A | 4/1990 | Hall et al. |
| 5,077,895 A | 1/1992 | Okubo et al. |
| 5,105,542 A | 4/1992 | Nakajima et al. |
| 5,292,210 A * | 3/1994 | Norwick ................. 408/204 X |
| 5,487,220 A | 1/1996 | Saitou |
| 5,511,305 A | 4/1996 | Garner |
| 5,664,324 A | 9/1997 | Hoffa et al. |
| 5,673,486 A | 10/1997 | Brown |
| 5,829,141 A | 11/1998 | Pick |
| 6,161,289 A | 12/2000 | Alexander |
| 6,381,850 B1 | 5/2002 | Warner |
| 6,397,474 B1 | 6/2002 | Losinger |

FOREIGN PATENT DOCUMENTS

GB 1057254 2/1967

* cited by examiner

Primary Examiner—Douglas D. Watts
(74) Attorney, Agent, or Firm—Richard C. Litman

(57) ABSTRACT

The automatic field cable stripper is a three-part device attachable to a hand-held power drill which is used to remove the outer insulation jacket from the end of a cable to a desired length. The three parts of the stripper are: a cylindrically shaped cutter with a plurality of annularly arranged knife edges, a cylindrically shaped cutter shield and an arbor for attaching to the drill. The dimensions of the cutter and shield are preset to match the corresponding dimensions of the inner conductor and the outer insulation jacket. A set of differently sized strippers is also contemplated.

3 Claims, 2 Drawing Sheets

AUTOMATIC FIELD CABLE STRIPPER

BACKGROUND OF THE INVENTION

1. Field of the Invention

The present invention relates to cable insulation strippers. More particularly, the automatic field cable stripper of the present invention is an attachment for al handheld power drill which is used for stripping external insulation from high voltage or high tension electrical cables in the field.

2. Description of the Related Art

Attachments for use with power drills to strip insulation from electrical cables are known. However, most such attachments cut the insulation using one or more knife blades that are adjustable and/or removable rather than being permanently fixed, i.e., being an integral part of the device.

U.S. Pat. No. 969,339, issued to Chytraus on Sep. 6, 1910, teaches a device for cutting insulation from conductors manually using a pair of knife blades positioned parallel and perpendicularly to the conductor, respectively, to perform the cutting, as shown by reference numbers 16 and 21 of FIG. 1 of the patent. U.S. Pat. No. 3,614,905, issued to Bieganski on Oct. 26, 1971, teaches a cable stripping apparatus having a pair of cutters used to apply an annular incision to the outer insulation that is then removed axially away from the remainder of the conductors to expose the underlying conductors. The apparatus is provided with a stop to limit the depth of the cut.

U.S. Pat. No. 3,623,384, issued to Murphy on Nov. 30, 1971, teaches a device for removing cable insulation using knives that can apply both a longitudinal cut, as well as a radial cut, using two different cutting blades, as shown by reference number 29 in FIG. 8 and reference number 70 in FIGS. 15 and 16 of the Murphy patent. U.S. Pat. No. 4,027,557, issued to Stepan on Jun. 7, 1977, teaches a wire stripping device that uses a single swinging knife blade, as shown by reference number 9 in the Figures.

U.S. Pat. No. 4,059,893, issued to Solury on Nov. 29, 1977, teaches a coaxial cable cutting tool. U.S. Pat. No. 4,317,279, issued to Smith et al. on Mar. 2, 1982, teaches a handheld power drill that drives a coaxial cable trimmer which uses a pair of circumferentially positioned blades to progressively "shave off" the outer insulation from the cable. The blades are individually removable from the multi-part device. Trimmed insulation shavings exit the tool through ports provided in the tool.

U.S. Pat. No. 4,594,029, issued to Michael III on Jun. 10, 1986, teaches a method of trimming a cable using a rotating hand tool. The multipart device includes a two-bladed cutter which trims away the insulation and outer conductor from coaxial cables. U.S. Pat. No. 4,729,268, issued to Morrow on Mar. 8, 1988, teaches a coaxial cable skiving tool. U.S. Pat. No. 4,914,818, issued to Hall et al. on Apr. 10, 1990, teaches a handheld manually operated coaxial cable cutter.

U.S. Pat. Nos. 5,077,895, issued to Okubo et al. on Jan. 7, 1992, and 5,487,220 issued to Saitou on Jan. 30, 1996, both teach an exfoliating device for removing cable insulation having cutting blades capable of cutting the insulation either longitudinally or radially. U.S. Pat. No. 5,105,542, issued to Nakajima et al. on Apr. 21, 1992, teaches a tool that cuts away the outer insulation from a coaxial cable in a spiral fashion.

U.S. Pat. No. 5,511,305, issued to Garner on Apr. 30, 1996, teaches a coaxial cable stripping device that removes the insulation in a spiral fashion, similar to the action of a pencil sharpener. U.S. Pat. No. 5,664,324, issued to Hoffa et al. on Sep. 9, 1997, teaches an apparatus for radially cutting and then stripping the insulation by removing it axially from the remaining conductor. U.S. Pat. No. 5,673,486, issued to Brown on Oct. 7, 1997, teaches a cable insulation stripper that cuts specific individual lengths of slugs of sleeves.

U.S. Pat. No. 5,829,141 issued to Pick on Nov. 3, 1998 teaches a device for cutting cable insulation which includes a repositionable knife that can be set to cut either circumferential or lengthwise cuts. U.S. Pat. No. 6,161,289, issued to Alexander on Dec. 19, 2000, teaches a wire stripper attachable to a power drill or a ratchet having openings to accommodate various sized conductors and that can strip insulation in a spiral fashion.

U.S. Pat. No. 6,381,850, issued to Warner on May 7, 2002, teaches a cable stripping device that can be rotated using a drill. U.S. Pat. No. 6,397,474, issued to Losinger on Jun. 4, 2002, teaches a cable preparation tool particularly for use on corrugated coaxial cables. UK Patent No. 1,057,254, published Feb. 1, 1967, teaches a cable sheathing stripper including a curved knife blade.

None of the above inventions and patents, taken either singly or in combination, is seen to describe the instant invention as claimed. Thus an automatic field cable stripper solving the aforementioned problems is desired.

SUMMARY OF THE INVENTION

AII The automatic field cable stripper is a three-part device attachable to a handheld power drill that is capable of stripping the outer insulation layer from an insulated conductor cable. The device includes an arbor, a cutter, and a shield which are threadably connected together. The arbor provides a support for attaching the device to the chuck of a power drill. During use, ribbon-like shavings of the removed cable insulation are produced as the knife edges of the cutter cut the insulation. The shavings exit the device through ports in the shield.

The cutter includes a plurality of annularly arranged knife edges that are an integral part of the cutter, i.e., the knife edges are not separable from the cutter. Also, the knife edges are oriented in a manner that removes the insulation along a direction that is coaxial with the cable. Moreover, the cutter includes an internal stop to limit the length of insulation removed from the cable.

The cutter and shield are sized to correspond to the size of a conductor cable and with the thickness of the insulation, i.e., the cutter and its shield are matched to a specific conductor cable. A set of differently sized cutters with housings are needed to remove insulation from correspondingly sized cables.

Accordingly, it is a principal object of the invention to provide a three-part cable stripper that is powered by a handheld power drill to remove the outer layer of insulation from a cable, including a cutter provided with a plurality of annularly placed knife edges that remove insulation axially along the length of the cable.

It is another object of the invention to provide a cable stripper attachment for a power drill having an internal stop for removing a predetermined length of insulation from a cable.

It is a further object of the invention to provide a set containing cable strippers for power drills having various sizes corresponding to various cable diameters.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a three-piece automatic field cable stripper 100 that is attachable to, and powered by, a handheld power drill.

Figure 1:
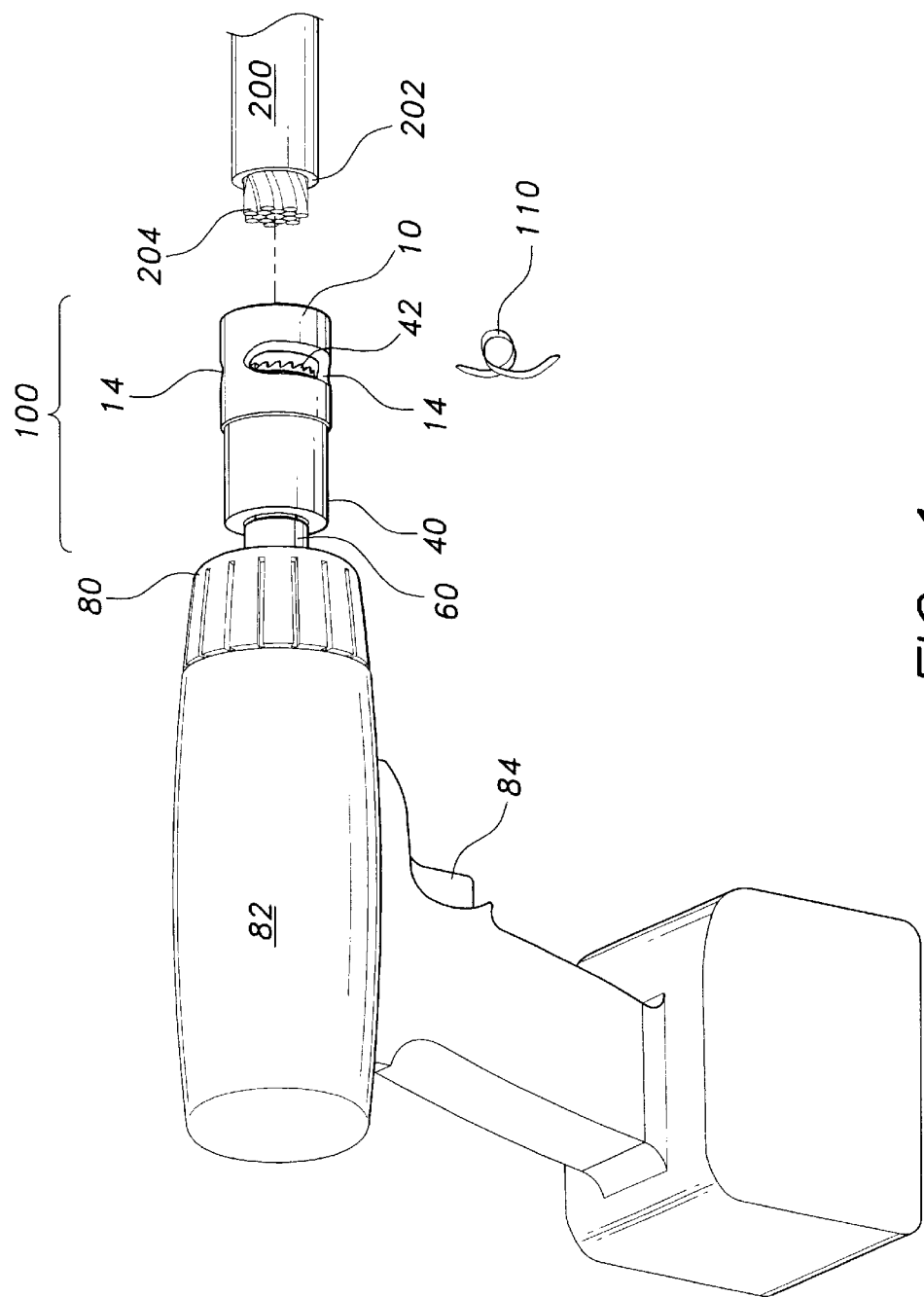
FIG. 1 is an environmental, perspective view of an automatic field cable stripper according to the present invention attached to a power drill.

FIG. 1 shows the cable stripper 100 attached to the chuck 80 of a handheld power drill 82, the arbor 60 being clamped by the gripping jaws (not shown) of the chuck, as conventional with power drill bits and attachments. Upon actuation of the drill 82, such as by depressing a trigger switch 84, the drill 82 causes the cable stripper 100 to rotate in order to remove the outer layer of insulation 202 from the cable 200, thereby exposing a portion of the conductors 204. In this case, the drill can be any known power drill, including electrical and pneumatic. Removed insulation 110 is eliminated through ports 14 in the shield 10.

Shield 10 is fastened to cutter 40 by a threaded connection. Also, cutter 40 is threadably fastened to arbor 60. The conductor cable 200 is then inserted into the bore 16 defined by the shield 10 of the stripper 100 to strip the outer insulation 202 from the cable 200. The exposed conductors 204 are thus prepared for attaching a lug to the end of the cable 200.

Figure 2:
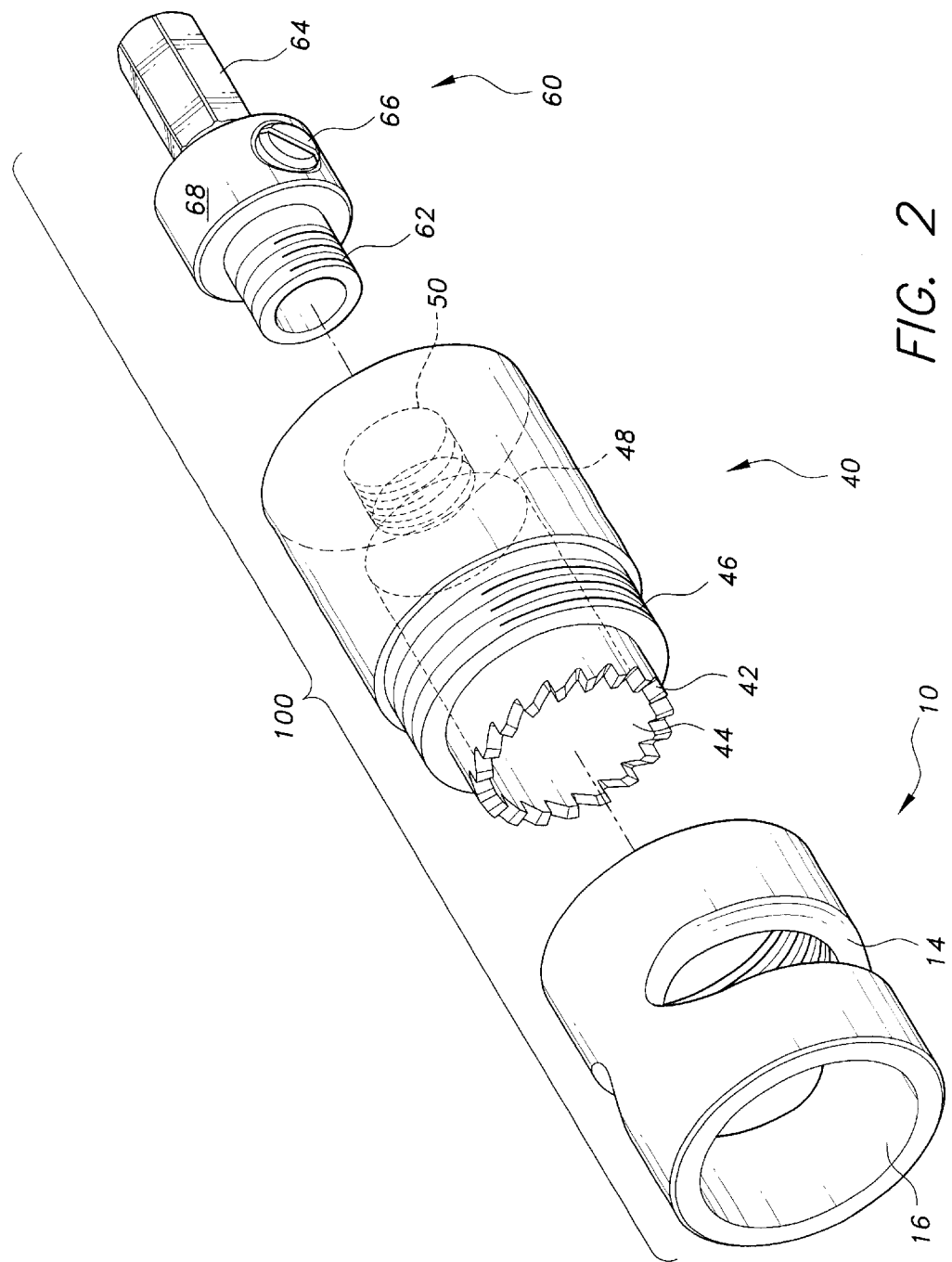
FIG. 2 is an exploded, perspective view of the automatic field cable stripper according to the present invention.

As shown in the exploded view, of FIG. 2, the cable stripper 100 is made up of three parts that are fastened together by threaded joints. The three parts are: a cylindrically shaped, cutter 40, a cutter shield 10, and an arbor 60 for attaching the cable stripper 100 to the chuck of a handheld power drill. The cutter 40 has a set of annularly placed cutting edges (also referred to as teeth or knife edges) 42 and defines a bore 44. External threads 46 permit the cutter to be fastened to cutter shield 10, which has corresponding internal threads.

The cutter casing has an outer diameter slightly larger than threads 46, forming a lip upon which shield 10 seats when threaded onto cutter 40. Cutting edges 42 define a circle of smaller diameter than threads 46, so that when shield 10 is threaded onto cutter 40, cutting edges 42 extend into the bore 16 defined by shield 10, cutting edges 42 being visible through ports 14 defined in shield 10. In use, the size of the cable stripper 100 is selected so that the diameter of the bore 16 defined by shield 10 is large enough to receive cable 200 with insulation 202, but the diameter of bore 44 defined by cutter 40 is only large enough to receive metal conductors 204, so that the tip ends of cutting edges 42 are aligned with and cut through insulation 202 as the cable is advanced into the bores 16 and 44.

Bore 44 in cutter 40 is sized to match the diameter of the conductor 204 inside the cable 200. The thickness of the knife edges 42 is sized to match the thickness of the insulation jacket 202 of the cable 200. Bore 44 also has an internal stop 48 which ensures that the required length of the insulation is removed and is not exceeded. The depth of the stop 48 corresponds approximately to the length of the lug with an additional ⅛" to ensure adequate length for attaching the lug to the stripped cable end. The stop 48 may be formed by an annular flange extending into the bore 44, or by a circular plate disposed transversely in the bore 44 at a predetermined distance.

External threads on a stud 62 extending from the end of the arbor shaft 64 permit the arbor to be attached to the cutter 40 by mating with an internally threaded bore 50 defined in the cutter 40. A single integral arbor construction is contemplated.

The cutter 40 is preferably made of hardened steel and the knife edges 42 can be sharpened as needed, e.g., using a grinder similar to the type commonly used for sharpening saw blades, etc. A lathe can also be used for resharpening the knife edges.

The arbor 60, cutter 40 and cutter shield 10 can be made of any suitably strong material, such as steel.

Although a single cable stripper 100 is depicted in FIGS. 1 and 2, a set of such cable strippers 100 corresponding to various sizes of cables is also contemplated.

Moreover, although the cable stripper 100 can be used to remove insulation from insulated cable, the stripper 100 is preferably used for high voltage cables. High voltage cables typically are constructed of one or more central current carrying conductors covered by an outer insulating sleeve. Cable sizes including 0 AWG (American Wire Gauge) and larger sizes, e.g., up to 2000 MCM (thousand circular mils) or more, Hare contemplated. Also, when more than one conductor is present, the conductors have standard circular cross-section or trapezoidal cross-sections for use in compact cables.

The device is usable in field applications to prepare the ends of cables for attaching corresponding lugs.

It is to be understood that the present invention is not limited to the embodiments described above, but encompasses any and all embodiments within the scope of the following claims.

I claim:

1. An automatic field cable stripper for field stripping insulation from cable, comprising:

an arbor including an arbor shaft having a first end adapted for being clamped by a chuck of a power drill, and having a second end forming a threaded stud;

a cutter having a cylindrical casing and having a first end defining an internally threaded bore, the cutter being releasably attached to the arbor by engaging the metal stud with the internally threaded bore, the cutter further having an externally threaded second end and a plurality of cutting edges extending from the second end and defining a cutter bore adapted for receiving the cable;

a shield, the shield being cylindrical and defining a shield bore adapted for receiving the cable, the shield having an internally threaded end and having a plurality of ports defined therein, the shield being releasably attached to the cutter by engaging the externally threaded end of the cutter with the internally threaded end of the shield, the plurality of cutting edges being disposed within the shield bore at a level even with the ports;

wherein the shield bore is adapted for receiving the cable encased in insulation and the cutter bore is adapted for receiving the cable with the insulation removed, whereby the cutting edges are aligned with and removes the insulation from the cable axially when the power drill is turned on.

2. The automatic field cable stripper according to claim 1, wherein said cutter further comprises a stop disposed within the cutter bore, the stop being adapted for limiting travel of the cable into the cable stripper.

3. An automatic field cable stripper kit, comprising:

a plurality of cable strippers, each cable stripper including:

an arbor including an arbor shaft having a first end adapted for being clamped by a chuck of a power drill, and having a second end forming a threaded stud;

a cutter having a cylindrical casing and having a first end defining an internally threaded bore, the cutter being releasably attached to the arbor by engaging the metal stud with the internally threaded bore, the cutter further having an externally threaded second end and a plurality of cutting edges extending from the second end and defining a cutter bore adapted for receiving the cable;

a shield, the shield being cylindrical and defining a shield bore adapted for receiving the cable, the shield having an internally threaded end and having a plurality of ports defined therein, the shield being releasably attached to the cutter by engaging the externally threaded end of the cutter with the internally threaded end of the shield, the plurality of cutting edges being disposed within the shield bore at a level even with the ports;

wherein the shield bore is adapted for receiving the cable encased in insulation and the cutter bore is adapted for receiving the cable with the insulation removed, whereby the cutting edges are aligned with and removes the insulation from the cable axially when the power drill is turned on; and wherein the diameter of the shield bore and the cable bore in each of the plurality of strippers is different, the kit being adapted for stripping insulation from cables of different diameter.

* * * * *